United States Patent
Herbelin et al.

(10) Patent No.: US 8,615,563 B2
(45) Date of Patent: Dec. 24, 2013

(54) METHOD FOR SWITCHING AN ACCESS NODE

(75) Inventors: Philippe Herbelin, Vincennes (FR); Khadija Daoud Triki, Meudon (FR); Cédric Leveque, Thiais (FR)

(73) Assignee: France Telecom, Paris (FR)

( * ) Notice: Subject to any disclaimer, the term of this patent is extended or adjusted under 35 U.S.C. 154(b) by 152 days.

(21) Appl. No.: 13/201,035

(22) PCT Filed: Feb. 16, 2010

(86) PCT No.: PCT/FR2010/050258
§ 371 (c)(1),
(2), (4) Date: Aug. 11, 2011

(87) PCT Pub. No.: WO2010/094882
PCT Pub. Date: Aug. 26, 2010

(65) Prior Publication Data
US 2011/0314123 A1 Dec. 22, 2011

(30) Foreign Application Priority Data
Feb. 20, 2009 (FR) ...................................... 09 51121

(51) Int. Cl.
*G06F 15/16* (2006.01)

(52) U.S. Cl.
USPC ............ 709/217; 455/436; 379/156; 370/331

(58) Field of Classification Search
USPC ................... 709/216–219; 370/331; 455/436; 379/156
See application file for complete search history.

(56) References Cited

U.S. PATENT DOCUMENTS

| | | | | |
|---|---|---|---|---|
| 5,283,871 | A * | 2/1994 | Kobayashi | 709/227 |
| 5,369,784 | A * | 11/1994 | Nelson | 455/503 |
| 6,985,446 | B1 * | 1/2006 | Hurtta et al. | 370/249 |
| 7,284,053 | B1 * | 10/2007 | O'Rourke et al. | 709/226 |
| 7,301,935 | B1 * | 11/2007 | Chaturvedi et al. | 370/352 |
| 2001/0043579 | A1 * | 11/2001 | Tourunen et al. | 370/331 |
| 2004/0067735 | A1 * | 4/2004 | Lobley | 455/41.2 |
| 2004/0236547 | A1 * | 11/2004 | Rappaport et al. | 703/2 |
| 2005/0063324 | A1 * | 3/2005 | O'Neill et al. | 370/310 |
| 2005/0203912 | A1 * | 9/2005 | Beach et al. | 707/10 |
| 2007/0249291 | A1 * | 10/2007 | Nanda et al. | 455/73 |

* cited by examiner

*Primary Examiner* — Dustin Nguyen
(74) *Attorney, Agent, or Firm* — Drinker Biddle & Reath LLP

(57) ABSTRACT

Method for switching access nodes for a terminal capable of implementing a set of applications with at least one remote communicating entity through a packet-switched network, said terminal being associated with a set of first communication contexts, a first communication context including a same first transport configuration common to the set of applications and a first application configuration corresponding to a given application. The method comprises the following steps, reiterated for all the first communication contexts: reception by the terminal of an access node switching notification message, said message indicating a second communication context including a second transport configuration, reception by the terminal of notification message count information, filtering of said second transport configuration of said second communication context on the basis of said count information, transmission of a filtered notification message to the application corresponding to the current iteration.

8 Claims, 2 Drawing Sheets

METHOD FOR SWITCHING AN ACCESS NODE

CROSS-REFERENCE TO RELATED APPLICATIONS

This application is the U.S. national phase of the International Patent Application No. PCT/FR2010/050258 filed Feb. 16, 2010, which claims the benefit of French Application No. 09 51121 filed Feb. 20, 2009, the entire content of which is incorporated herein by reference.

BACKGROUND

The field of the invention is that of tele-communications and, more specifically, that of mobile radiocommunication networks.

More particularly, the invention relates to the switching of access nodes of a terminal in the process of implementing a plurality of applications with one or more remote communicating entities through a packet-switched network.

Initially, the terminal is connected to an origin access node but may be required to switch from the origin access node to a destination access node because of its mobility. It will be noted that the origin and destination access nodes may belong to one and the same access network or indeed to different access networks. They may be access networks of cellular mobile radio-communication networks, for example of UMTS (Universal Mobile Telecommunications System) type, or wireless, for example of WIMAX (Worldwide Interoperability for Microwave Access) type, or even wired, for example FTTH (Fiber To The Home). Whatever the case, this (these) access network(s) is (are) connected to a packet-switched network, for example an IP (Internet Protocol) type network supporting all the applications used by the terminal. Also, the terminal may be, without differentiation, a single-technology, multi-technology or reconfigurable single-technology terminal.

The access node is, for example, a base station of a UMTS, HSDPA or even LTE network ("Node B" or "Evolved node B"), or even an access point of a WIMAX network.

The multiplicity of remote communicating entities with which the terminal implements the plurality of applications may consist of one or more other user terminals and/or one or more remote servers. The packets exchanged between the terminal and the multiplicity of remote communicating entities take, for each application, a path including intermediate nodes. In the case where the terminal is switched from an origin access node to a destination access node ("handover"), the various paths taken to implement the plurality of applications are modified.

The OSI model, standardized by the ISO (International Organization for Standardization), defines data transfer management by means of seven stacked protocol layers: the physical layer (layer 1), the data link layer (layer 2), the network layer (layer 3), the transport layer (layer 4), the session layer (layer 5), the presentation layer (layer 6) and the application layer (layer 7). The various nodes of the tele-communication networks incorporate all or some of these layers. The terminal itself has all seven layers of the OSI model.

The first three layers, called bottom layers, relate to the implementation of the connection and the routing of the data. They are transparent with respect to the type of data transported. The next four layers, called top layers, are responsible for the processing of the data so that an application can be offered to the terminal.

There are other communication models that use layers, notably an IETF (Internet Engineering Task Force) model with five layers, for which the layers 5 to 7 defined above are combined.

By definition, a communication context comprises all the information required for the implementation of an application and relating to all the layers of the communication model used.

The body of communication context information required for the transport of the data with a destination communicating entity for a given application is here called transport configuration. The transport information comprises, for example, the IP address of the terminal, the identity of the access node, parameters relating to the radio link between the terminal and the access node such as the frequency.

Similarly, the body of communication context information required for the implementation by the terminal of a particular application is called application configuration. These parameters are, for example, the type of application, the bit rate, the type of coder/decoder activated for the application concerned implemented through the access node.

It will be recalled that, in the bottom layers, the protocols are exchanged between the adjacent intermediate nodes, whereas in the top layers the protocols are exchanged between the terminal and the remote communicating entity or entities which may be separated by numerous intermediate nodes. For a given application, the bottom layers are thus strung along a path between the terminal and the corresponding remote communicating entity through the intermediate nodes.

In the case of a UMTS network, the intermediate nodes are, for example, in succession, a base station controller RNC (for radio network controller), an SGSN (Serving GPRS Support Node) gateway, a GGSN (Gateway GPRS Support Node) gateway which maintain a communication context linked to the terminal and to the current applications. In the upgrades of the UMTS network, the functionalities of the controller are distributed between the base stations and the gateways which constitute the intermediate nodes, called SAE gateway and PDN gateway.

In the case of WIMAX-type wireless networks, the intermediate nodes are, for example, the AGW gateways and routers implementing the MIP protocol of the MIP (Mobile Internet Protocol) network layer.

The generic access node switching procedures comprise an access node switching decision step, a step for attaching the terminal to the destination access node by setting up a link on the data link layer, a step for determining and updating the path linking the terminal and the remote communicating entity through this new access node, and a step for reconfiguring the terminal to update the application configurations according to the state of a second link between the terminal and the destination access node.

For access node change management initialized by an element of the access network, called switching node, protocols of the "end-to-end" type are used between this switching node and the remote communicating entities for the execution of an update of the various communication contexts. The switching node is, for example, an origin access node or an intermediate node common to the various paths. The protocols are, for example, the SCTP (Stream Control Transmission Protocol) transport layer protocol, or the SIP (Session Initiation Protocol) session layer protocol. These protocols implement signaling messages whose function is to inform the destination communicating entities of a change of IP address of the terminal. For each current application, a command to execute an update of the communication context is sent to the terminal; it also includes the sending of a transport configuration change notification.

A set of notification messages is therefore sent by the switching node to the terminal corresponding to the set of current applications.

The reception by the terminal of the first notification message of the set of notification messages sent results in the reconfiguration of the terminal, notably its reconfiguration according to the modified transport configuration of the new communication context. In the case of a set of applications for which the initial transport configuration is identical, the reception of the first message results in the loss of connectivity of the terminal with the switching node. The terminal is then no longer able to receive the subsequent messages of the set of notification messages corresponding to this set of applications. In this case, additional signaling messages are necessary in order to update the paths for these pending applications. In addition to an additional resource consumption for these signaling messages, delays in updating the application configurations of the pending applications are generated which may cause these applications to crash or malfunction, notably in the case of real-time applications.

For access node switching management initialized by a switching node, there is therefore a need for access node switching capability suitable for updating a set of applications for a terminal in communication with one or more remote communicating entities.

SUMMARY

Various embodiments of the invention therefore propose an access node switching method for a terminal capable of implementing a set of applications with at least one remote communicating entity through a packet-switched network, the terminal being associated with a set of first communication contexts, a first communication context including a same first transport configuration common to the set of applications and a first application configuration corresponding to a given application. The method comprises iterations of the following steps:
  reception by the terminal of an access node switching notification message, the message indicating a second communication context including a second transport configuration,
  reception by the terminal of notification message count information,
  filtering of the second transport configuration of said second communication context based on the count information,
  transmission of a filtered notification message to the application corresponding to the current iteration,
the steps being reiterated for all the first communication contexts.

Thus, the reconfiguration of the terminal is controlled in order to prevent the premature recognition of the second transport configuration common to the set of applications. Furthermore, the second communication context includes an indication concerning a second application configuration. The terminal is thus able to anticipate access node switching for each application implemented, for example the type of application or else the type of coder/decoder, by the earliest possible reconfiguration of the parameters required for the implementation of each application.

The filtering step comprises, for a current iteration, the following substeps:
  deletion of the second transport configuration, for all the iterations, and
  updating of transport parameters based on the second transport configuration when the count information indicates that the current iteration is the last iteration.

Thus, the reception of the last second communication context by the terminal results in the reconfiguration of the terminal, notably by the application of the information required for the data transport after switching. The final reconfiguration of the terminal is therefore carried out only after all the notification messages have been received. The switching is then performed, the body of information required for the implementation of the applications having been updated during the successive iterations in order to reduce the switching times.

Also, the filtering of the notification message makes it possible to provide an accountability with an implementation of preexisting applications in the terminal.

The access node switching notification message and the count information are sent by a switching node.

Protocols of the "end-to-end" type are used between a switching node and the remote communicating entities to update the various communication contexts. The switching node can thus access the communication context information without adding complexity and without increasing the processing time.

In a particular embodiment, the switching node is an access node to which the terminal is connected before switching.

Embodiments of the invention also relate to a method for controlling access node switching for a terminal capable of implementing a set of applications with at least one remote communicating entity through a packet-switched network, said terminal being associated with a set of first communication contexts, a first communication context including a same first transport configuration common to the set of applications, and a first application configuration corresponding to a given application. The method, implemented in a switching node, comprises:
  a step for sending an access node switching notification message to said terminal, the message indicating a second communication context including a second transport configuration,
  a step for sending count information associated with said notification message,
the steps being implemented iteratively for all the first communication contexts.

Thus, the switching node keeps control of the access node switching, also being responsible for the signaling with the remote communicating entity or entities.

Embodiments of the invention also relate to an access node switching device for a terminal capable of implementing a set of applications with at least one remote communicating entity through a packet-switched network, said terminal being associated with a set of first communication contexts, a first communication context including a same first transport configuration common to the set of applications and a first application configuration corresponding to a given application. The device comprises:
  means for receiving an access node switching notification message, the message indicating a second communication context including a second transport configuration,
  means for receiving notification message count information,
  means for filtering the second transport configuration of the second communication context on the basis of the count information,
  means for transmitting a filtered notification message to the application corresponding to the current iteration, the means being implemented iteratively for all the first communication contexts.

Embodiments of the invention also relate to a device for controlling switching of access nodes for a terminal capable of implementing a set of applications with at least one remote communicating entity through a packet-switched network, the terminal being associated with a set of first communication contexts, a first communication context including a same first transport configuration common to the set of applications and a first application configuration corresponding to a given application. The device comprises:
- means for sending an access node switching notification message to the terminal, the message indicating a second communication context including a second transport configuration,
- means for sending count information associated with said notification message, the means being implemented iteratively for all the first communication contexts.

Embodiments of the invention also relate to a terminal including an access node switching device described previously.

Embodiments of the invention also relate to a switching node including a switching control device described previously.

Embodiments of the invention also relate to a telecommunication system comprising at least one terminal and one switching node as described previously.

Embodiments of the invention also relate to a computer program for a terminal including software instructions for controlling the implementation of the access node switching method when this program is executed by the terminal.

Embodiments of the invention also relate to a computer program for a switching node including software instructions for controlling the implementation of the steps of the switching control method when this program is executed by the switching node.

The devices, terminal, switching node and system offer advantages similar to those described previously.

BRIEF DESCRIPTION OF THE DRAWINGS

The invention will be better understood with the help of the following description of a particular embodiment of the switching method, with reference to the appended drawings which illustrate an entirely nonlimiting exemplary embodiment thereof.

DETAILED DESCRIPTION

Figure 1:
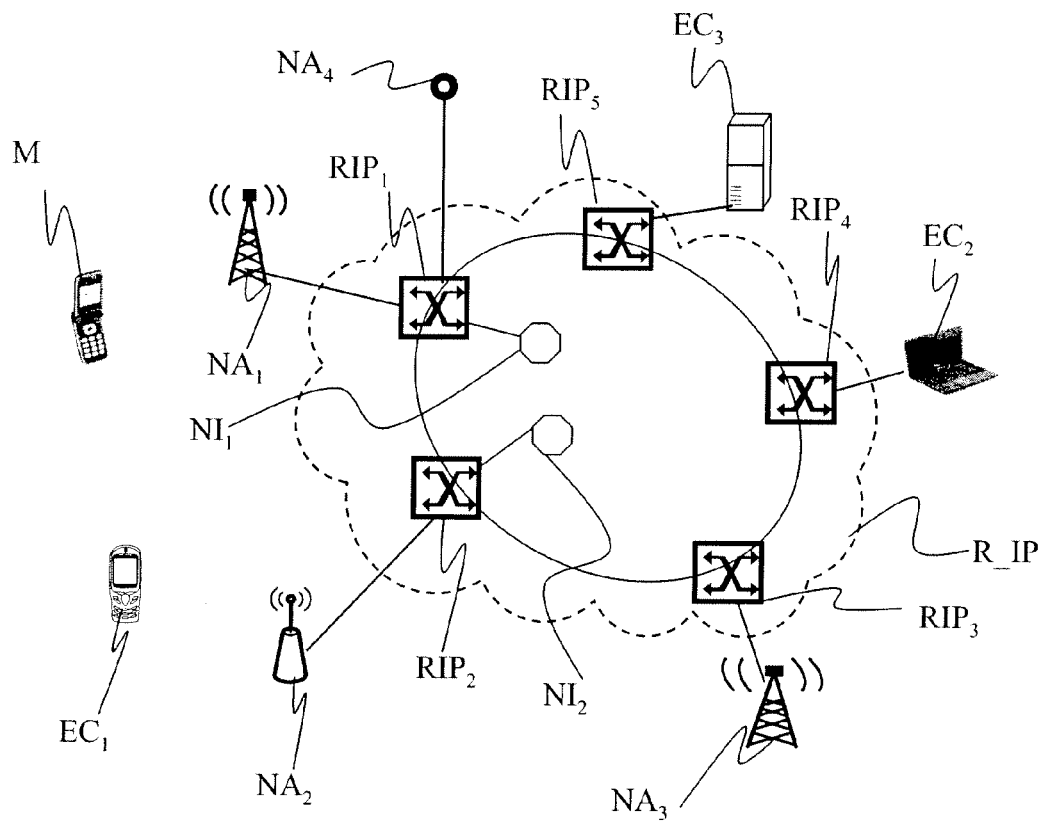
FIG. 1 represents a telecommunication network architecture comprising a terminal connected to an access node according to the invention.

FIG. 1 represents a telecommunication network architecture for interconnecting a terminal M connected to an access node $NA_1$ with a set of remote communicating entities connected to a packet-switched network R_IP, a remote communicating entity offering the terminal M at least one application through the packet-switched network. The remote communicating entity is, for example, an equipment item $EC_1$ equipped with a communicating card and connected to the network R_IP via an access node $NA_2$, a server $EC_3$ or even a home equipment item $EC_2$ connected to the network R_IP.

The telecommunication network comprises a plurality of access nodes. The access nodes may belong to one and the same access network or to different access networks. In the interests of clarity, the access networks are not represented in FIG. 1. By way of illustrative and nonlimiting example as represented in FIG. 1, the access nodes $NA_1$ and $NA_3$ correspond to base stations of a UMTS-type mobile radiocommunication network, the access node $NA_2$ corresponds to an access point for a WIMAX-type wireless network, the access node $NA_4$ corresponds to an access point for an FTTH-type wired network.

The various access nodes are connected to the packet-switched network R_IP, for example by IP routers ($RIP_1$, $RIP_2$, $RIP_3$, $RIP_4$, $RIP_5$).

The data exchanged between the terminal and the communicating entity or entities take paths which include intermediate nodes.

In the case of a UMTS network, intermediate nodes are, for example, in succession, a base station controller RNC (radio network controller), an SGSN (Serving GPRS Support Node) gateway, a GGSN (Gateway GPRS Support Node) gateway which maintain a communication context linked to the terminal and to the current applications. In the upgrades of the UMTS network, the functionalities of the controller are distributed between the base stations and the gateways which constitute the intermediate nodes, called SAE gateway and PDN gateway.

In the case of WIMAX-type wireless networks, the intermediate nodes are, for example, the AGW gateways and routers implementing the MIP (Mobile Internet Protocol) network layer MIP protocol.

In the interests of clarity, only two intermediate nodes $NI_1$ and $NI_2$ are represented in FIG. 1.

The OSI model, standardized by the ISO (International Organization for Standardization), defines the management of data transfers by means of seven stacked protocol layers: the physical layer (layer 1), the data link layer (layer 2), the network layer (layer 3), the transport layer (layer 4), the session layer (layer 5), the presentation layer (layer 6) and the application layer (layer 7). The various nodes of the telecommunication networks incorporate all or some of these layers. The terminal itself has all seven layers of the OSI model.

The first three layers, called bottom layers, relate to the implementation of the connection and to the routing of the data. They are transparent with respect to the type of data transported. The next four layers, called top layers, are responsible for the processing of the data enabling an application to be offered to the terminal.

For access node change management performed by an element of the access network, called switching node, protocols of the "end-to-end" type are used between this switching node and the remote communicating entities to update the various communication contexts.

The switching node is, for example, an access node or even an intermediate node.

For an OSI-type communication model, the switching nodes according to embodiments of the invention incorporate the bottom layers and at least the layers 4 and 5, respectively transport and session. For a 5-layer IETF-type model, the switching nodes incorporate all the protocol layers.

By definition, a communication context comprises all the information required to implement an application and relating to all the layers of the communication model used.

The expression "transport configuration" will be used hereinafter in the document to designate the body of communication context information required for the transport of the data with a destination communicating entity for a given application. The transport information comprises, for example, the IP address of the terminal, the identity of the access node, parameters relating to the radio link between the terminal and the access node such as the frequency.

Similarly, the expression "application configuration" will be used to designate the body of communication context information required for the implementation by the terminal of the application concerned. These parameters are, for example, the type of application, the bit rate, the type of coder/decoder activated for the application concerned implemented through the origin access node.

Figure 2:
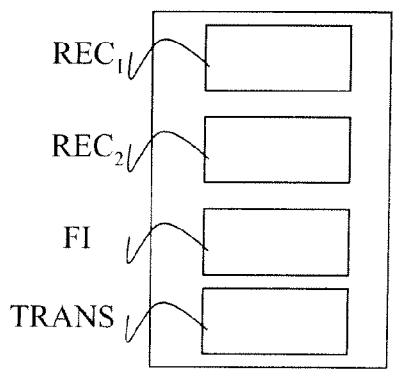
FIG. 2 represents a functional block diagram of an access node switching device for a terminal connected to an origin access node according to the invention.

FIG. 2 represents a functional block diagram of an access node switching device for a terminal connected to an origin access node according to embodiments of the invention.

The terminal implements a plurality of applications, not represented, with one or more remote communicating entities through a packet-switched network.

The terminal also includes a central control unit, not represented, to which the means included are linked and intended to control the operation of these means.

A set of applications is implemented by the terminal for which the data transport information is identical. In other words, the set of communication contexts relating to data transports via the origin access node, called first communication contexts, comprises one and the same first transport configuration common to the set of applications and a first application configuration corresponding to a given application.

The communication contexts relating to data transports via the destination access node are called second communication contexts.

The access node switching device comprises:
  means REC1 for receiving an access node switching notification message. The notification message indicates a second communication context including a second transport configuration and a second application configuration. This second communication context relates to a data transport via a destination access node.
  means REC2 for receiving notification message count information.
  means FI for filtering the second transport configuration on the basis of the notification message received by the receiver REC1 according to the count information.
  means TRANS for transmitting a filtered notification message to an application.

The means are implemented iteratively for all the current applications, the applications also being able to be reconfigured according to the parameters of the application configuration received.

In a particular embodiment, the reception means REC1 and REC2 are combined, for example if the notification message also includes the count information.

Figure 3:
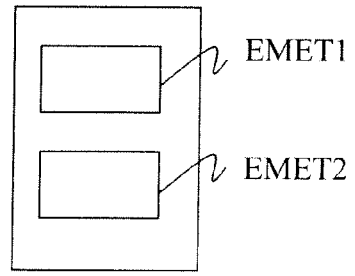
FIG. 3 represents a functional block diagram of an access node switching control device for a switching node.

FIG. 3 represents a functional block diagram of an access node switching device for a switching node.

The switching node implements means for signaling changes of access node to the remote communicating entities which are not represented. Thus, the switching node incorporates at least the transport protocol layers and at least the layers 4 (transport) and 5 (session) for an OSI model, or the 5 protocol layers for an IETF model.

The switching node is capable of informing the remote communicating entities of a change of access node, and in particular informing them of a change of IP address of the terminal. The remote communicating entities will take account of this new IP address of the terminal after switching. The switching node executes, for example, a transport layer protocol, such as SCTP (Stream Control Session Protocol), or a session layer protocol such as SIP (Session Initiation Protocol).

The switching node also includes a central control unit, not represented, to which the means included are linked and intended to control the operation of these means.

The access node switching device for a switching node comprises:
  means EMET1 for sending an access node switching notification message. The notification message indicates a second communication context including a second transport configuration and a second application configuration. This second communication context relates to a data transport via a destination access node.
  means EMET2 for sending count information associated with this access node change notification message.

The means are implemented iteratively for the set of current applications between the terminal and the remote communicating entity or entities.

In a particular embodiment, the sending means EMET1 and EMET2 are combined, for example if the notification message also includes the count information.

Figure 4:
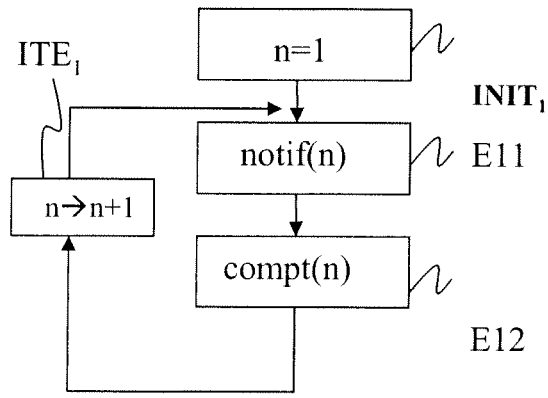
FIG. 4 represents an access node switching control method for a switching node according to the invention.

A particular example of implementation of the access node switching control method for a switching node will now be described with reference to FIG. 4.

Initially, the terminal is connected, or attached, to an origin access node and implements a set of N applications $APP_n$, n varying from 1 to N, with a plurality of remote communicating entities through the packet-switched network. The terminal is associated with a set of first communication contexts context_1($n$) including a first transport configuration conf_tx1($n$) and a first application configuration conf_app1($n$), n varying from 1 to N. The first communication contexts relate to data transports via the origin access node. Second communication contexts context_2($n$), n varying from 1 to N, relate to data transports via the destination access node. A second communication context includes a second transport configuration conf_tx2($n$) and a second application configuration conf_app2($n$), n varying from 1 to N.

These second communication contexts are determined during access node switching decision and management procedures implemented by an element of the network. These procedures, well known to those skilled in the art, decide on the access node switching and assign new routing paths for the set of applications.

In a particular embodiment, these decision and management procedures are implemented in the switching node.

Steps E11 to E12 are reiterated for all the second communication contexts, that is to say in an equivalent manner for the set of applications. The iterations are symbolized by an initialization step $INIT_1$ and a step $ITE_1$ for incrementation of the indices n of the applications $APP_n$, n varying from 1 to N.

In the step E11, the sender EMET1 of the switching node generates and sends an access node change notification message notif(n) to the terminal. This message indicates a second communication context context_2($n$) notably including a second transport configuration conf_tx2($n$) relating to future data exchanges via the destination access node for the application $APP_n$.

The notification message is, for example, an INVITE or RE-INVITE type message for the SIP protocol defined in the specification RFC 3261 defined by the IETF. This message is enriched with the communication context in the header or the body of the message.

In the step E12, the sender EMET2 of the switching node assigns and sends count information compt(n) associated with the notification message generated in the step E11. The count information corresponds, for example, to the number of iterations already performed, to the second communication context concerned, to the mode of execution of the transport configuration contained in the notification message.

In a particular embodiment, the count information is inserted into an available field of the notification message. For example, the count information is inserted after the field indicating the second communication context in the INVITE or RE-INVITE type message for the SIP protocol.

Figure 5:
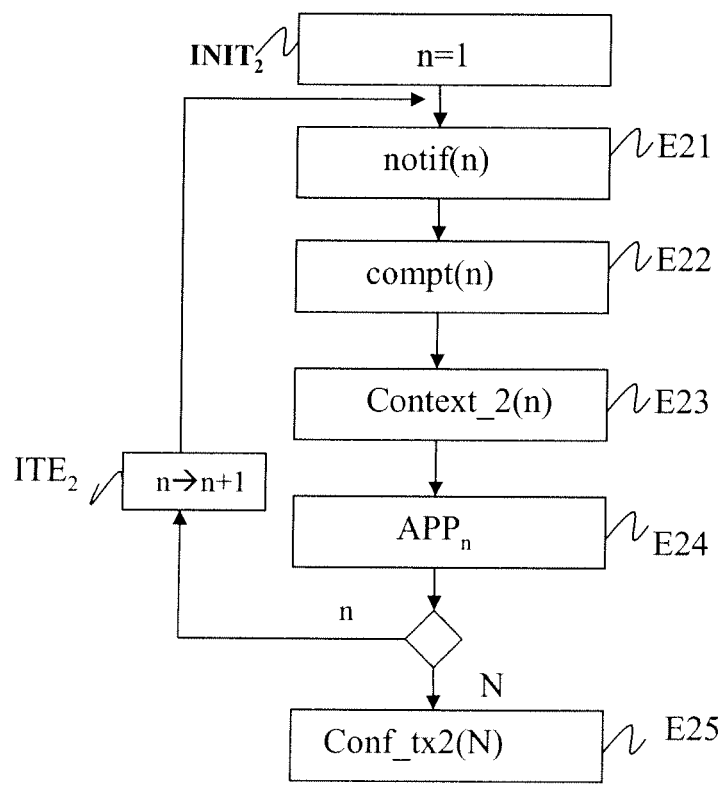
FIG. 5 represents an access node switching method for a terminal according to the invention.

A particular exemplary implementation of the access node switching method for a terminal according to an embodiment of the invention with reference to FIG. 5.

Initially, the terminal is connected, or attached, to an origin access node and implements a set of N applications $APP_n$, n varying from 1 to N, with a plurality of remote communicating entities through the packet-switched network. The terminal is associated with a set of first communication contexts context_1(n) including a first transport configuration conf_tx1(n) and a first application configuration conf_app1(n), n varying from 1 to N.

The data transport information for the set of applications is identical. In other words, the values of the information relating to the first transport configurations conf_tx1(n) are identical, n varying from 1 to N.

Steps E21 to E24 are reiterated for all the first communication contexts, that is to say in an equivalent manner for the set of applications. The iterations are symbolized by an initialization step $INIT_2$ and a step $ITE_2$ for incrementation of the indices n of the applications $APP_n$, n varying from 1 to N.

In a step E21, the receiver REC1 of the terminal receives a notification message, and in particular receives a second transport configuration context_2(n) for the application $APP_n$.

This notification message is sent by the switching node for example by an enriched INVITE or RE-INVITE type SIP message.

In a step E22, the receiver REC2 of the terminal receives count information compt(n).

This information is sent by the switching node.

In a particular embodiment, the steps E21 and E22 are carried out simultaneously by a single receiver if the count information has been inserted into an available field of the notification message.

For example, the message is an INVITE or RE-INVITE type SIP message enriched with the second communication context and the count information.

In a step E23, the filtering means FI of the terminal filter the second transport configuration conf_tx2(n) of the second communication context context_2(n).

Thus, the filtering means delete the information concerning the second transport configuration conf_tx2(n).

In a step E24, the transmission means of the terminal transmit a filtered notification message to the application APP corresponding to the iteration n.

This message is, for example, an INVITE or RE-INVITE type SIP message in the case of an SIP protocol.

The application APP can thus update its parameters according to the second application configuration conf_app2(n).

Furthermore, the filtering means FI of the terminal test the count information. If the count information indicates that the current iteration is the last iteration N, the transport parameters are updated according to the second transport configuration cont_tx2(N) in a step E25. The terminal can then receive and send data with the remote communicating entity or entities via the destination access node by reconfiguration of the transport parameters.

The embodiments of the invention described here relate to an access node switching device for a terminal. Consequently, the invention embodiments also applies to a computer program, notably a computer program on or in an information storage medium, suitable for implementing the invention. This program may use any programming language, and be in the form of source code, object code, or code intermediate between source code and object code, such as in a partially compiled form, or in any other desirable form for implementing the method according to the invention embodiments.

The same applies for the access node change control device for a switching node.

The information storage medium may be any entity or device capable of storing the program. For example, the medium may comprise a storage means or storage medium on which is stored the computer program according to embodiments of the invention, such as, but without being limited to, a ROM, for example a CD ROM or a microelectronic circuit ROM, or even a USB key, or a magnetic storage medium, for example a diskette (floppy disc) or a hard disc, or a chip card.

The invention claimed is:

1. A method for switching access nodes for a terminal capable of implementing a set of applications with at least one remote communicating entity through a packet-switched network, said terminal being associated with a set of first communication contexts, a first communication context comprising a same first transport configuration common to the set of applications and a first application configuration corresponding to a given application, said method comprising iterations of the following steps:
   receiving by the terminal of an access node switching notification message, said message indicating a second communication context including a second transport configuration,
   receiving by the terminal of notification message count information,
   filtering said second transport configuration of said second communication context based on said count information, wherein the filtering step comprises, for a current iteration, the following substeps:
   deleting said second transport configuration, and
   updating transport parameters based on said second transport configuration when the count information indicates that the current iteration is the last iteration; and
   transmitting a filtered notification message to the application corresponding to the current iteration,
   said steps being reiterated for all the first communication contexts.

2. The method as claimed in claim 1, wherein the access node switching notification message and the count information are sent by a switching node.

3. The method as claimed in claim 2, wherein the switching node is an access node to which the terminal is connected before switching.

4. A method for controlling the switching of access nodes for a terminal capable of implementing a set of applications with at least one remote communicating entity through a packet-switched network, said terminal being associated with a set of first communication contexts, a first communication context comprising a same first transport configuration common to the set of applications and a first application configuration corresponding to a given application, the method comprising:

on a switching node
sending an access node switching notification message to said terminal, said message indicating a second communication context including a second transport configuration, and
sending count information associated with said notification message,
the terminal
filtering said second transport configuration of said second communication context based on said count information, wherein the filtering step comprises, for a current iteration, the following substeps:
deleting said second transport configuration, and
updating transport parameters based on said second transport configuration when the count information indicates that the current iteration is the last iteration; and
transmitting a filtered notification message to the application corresponding to the current iteration,
said steps being implemented iteratively for all the first communication contexts.

5. A device for switching access nodes for a terminal capable of implementing a set of applications with at least one remote communicating entity through a packet-switched network, said terminal being associated with a set of first communication contexts, a first communication context comprising a same first transport configuration common to the set of applications and a first application configuration corresponding to a given application, said device comprising the elements of:
a receiver for receiving an access node switching notification message, said message indicating a second communication context comprising a second transport configuration,
a receiver for receiving notification message count information,
a filter for filtering said second transport configuration of said second communication context on the basis of said count information by
deleting said second transport configuration, and
updating transport parameters based on said second transport configuration when the count information indicates that the current iteration is the last iteration; and
a transmitter for transmitting a filtered notification message to the application corresponding to the current iteration,
said elements being configured for iterative operation for all the first communication contexts.

6. A telecommunication system for controlling the switching of access nodes for a terminal capable of implementing a set of applications with at least one remote communicating entity through a packet-switched network, said terminal being associated with a set of first communication contexts, a first communication context comprising a same first transport configuration common to the set of applications and a first application configuration corresponding to a given application, said telecommunication system comprising a switching node comprising:
a central control unit; and
an information storage medium containing instructions executable by the central control unit for
sending an access node switching notification message to said terminal, said message indicating a second communication context including a second transport configuration, and
sending count information associated with said notification message,
wherein the terminal comprises:
a central control unit; and
an information storage medium containing instructions executable by the central control unit for
filtering said second transport configuration of said second communication context based on said count information by
deleting said second transport configuration, and
updating transport parameters based on said second transport configuration when the count information indicates that the current iteration is the last iteration; and
transmitting a filtered notification message to the application corresponding to the current iteration,
said elements being configured for iterative operation for all the first communication contexts.

7. A non-transitory computer program product for a terminal comprising software instructions for controlling the implementation of the steps of the method as claimed in claim 1, when this program is executed by the terminal.

8. A non-transitory computer program product for a switching node comprising software instructions for controlling the implementation of the steps of the method as claimed in claim 4, when this program is executed by the switching node.

* * * * *